(12) United States Patent
Suryanarayana et al.

(10) Patent No.: US 9,912,454 B2
(45) Date of Patent: Mar. 6, 2018

(54) SYSTEMS AND METHODS FOR EFFICIENT FILE TRANSFER IN A BOOT MODE OF A BASIC INPUT/OUTPUT SYSTEM

(71) Applicant: Dell Products L.P., Round Rock, TX (US)

(72) Inventors: Shekar Babu Suryanarayana, Bangalore (IN); Ankit Singh, Bangalore (IN); Sumanth Vidyadhara, Bangalore (IN)

(73) Assignee: Dell Products L.P., Round Rock, TX (US)

(*) Notice: Subject to any disclaimer, the term of this patent is extended or adjusted under 35 U.S.C. 154(b) by 112 days.

(21) Appl. No.: 14/623,129

(22) Filed: Feb. 16, 2015

(65) Prior Publication Data

US 2016/0239314 A1 Aug. 18, 2016

(51) Int. Cl.
G06F 15/173 (2006.01)
H04L 5/00 (2006.01)
H04L 29/06 (2006.01)
G06F 9/44 (2018.01)

(52) U.S. Cl.
CPC .......... H04L 5/0044 (2013.01); G06F 9/4403 (2013.01); G06F 9/4406 (2013.01); H04L 69/16 (2013.01)

(58) Field of Classification Search
CPC ............................. H04L 69/16; H04L 69/161
USPC ....................................................... 709/225
See application file for complete search history.

(56) References Cited

U.S. PATENT DOCUMENTS

| 8,156,230 | B2 | 4/2012 | Bakke et al. | |
|---|---|---|---|---|
| 8,467,390 | B2 | 6/2013 | Persson et al. | |
| 2006/0256768 | A1* | 11/2006 | Chan | H04L 1/08 709/238 |
| 2007/0008973 | A1* | 1/2007 | Galea | G06F 9/4416 370/392 |
| 2008/0250155 | A1* | 10/2008 | Wang | H04L 12/1868 709/235 |
| 2010/0235464 | A1 | 9/2010 | Iyer et al. | |
| 2012/0221671 | A1* | 8/2012 | Chen | G06F 15/167 709/213 |
| 2014/0059155 | A1* | 2/2014 | Boucher | G06F 5/10 709/212 |

* cited by examiner

*Primary Examiner* — Jason Recek
(74) *Attorney, Agent, or Firm* — Jackson Walker L.L.P.

(57) ABSTRACT

An information handling system may include a processor, a network interface communicatively coupled to the processor, a storage resource communicatively coupled to the processor, and a basic input/output system (BIOS). The BIOS may be configured to, during a pre-boot environment of the information handling system: receive a datagram at the network interface from a network communicatively coupled to the network interface; determine if a variable is set within a header of the datagram indicating that a data payload of the datagram is to be bypassed by at least a portion of a network stack and a storage stack of the BIOS; and responsive to determining the variable is set, bypass the data payload by at least a portion of the network stack and the storage stack of the BIOS.

18 Claims, 3 Drawing Sheets

SYSTEMS AND METHODS FOR EFFICIENT FILE TRANSFER IN A BOOT MODE OF A BASIC INPUT/OUTPUT SYSTEM

TECHNICAL FIELD

The present disclosure relates in general to information handling systems, and more particularly to systems and methods for efficient file transfer during a boot mode of a basic input/output system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many information handling systems, a basic input/output system (BIOS), for example a Unified Extensible Firmware Interface (UEFI), is capable of operating in a pre-boot mode in which the BIOS executes certain instructions prior to loading and execution of an operating system. In such pre-boot mode, memory management may not be as effective as it is with an operating system, and additionally, a BIOS typically executes in a single-threaded boot environment with no scheduler, kernel, tasklets, work queues, etc., which might be present within an operating system in order to improve performance, including the processing of bulk payloads received via a network or a storage device. Accordingly, pre-boot setup and management activity including bulk image offloading such as firmware updates, operating system deployments, and other images may be very time consuming, which may lead to negative user experience.

To illustrate, offloading bulk images over a network in pre-boot mode involves generating multiple copies (e.g., approximately nine copies) to receive the payload from the bottom layer of a network stack, to the top layer of the network stack, and then to the bottom layer of a file system stack. FIG. 4 depicts a diagram of an example network and file system stack 2 illustrating the generation of such multiple copies. As shown in FIG. 1, when a network datagram (e.g., packet, frame) is received from a network 10 via a network interface card, a network interface card driver layer 12 may transfer (e.g., via direct memory access or "DMA") a copy of such received data into a receive buffer 14 (e.g., a circular ring buffer) of memory 6. A network interface card driver layer 12 may also copy the data of the received packet from receive buffer 14 into an Internet Protocol (IP) buffer 16 of memory 6. In turn, an IP layer 18 may copy data to a Transmission Control Protocol (TCP) and/or User Datagram Protocol (UDP) buffer 20 of memory 6 by stripping an IP header from the packet. A TCP/UDP layer 22 may copy data into a BIOS network protocol buffer 24 of memory 6 by stripping a TCP/UDP header from the remaining packet. A Common Internet File System (CIFS) and/or Network File System (NFS) file system network protocol layer 26 may perform another copy of data to a BIOS/UEFI application buffer 28 by stripping an application-level protocol header, leaving the payload of the packet remaining. Thus, up to five copies of the payload data may be made to transfer data from a network interface to BIOS/UEFI application buffer 28 for use by a BIOS at BIOS/UEFI application layer 30.

To move the data payload from BIOS/UEFI application layer 30 to storage resource 44, BIOS/UEFI application layer 30 may first copy the data to a file system buffer 32. BIOS file system layer 34 may then copy the data to a block sub-system buffer 36. BIOS block sub-system layer 38 may in turn execute a cache flush to a storage driver buffer 40. A storage device driver 42 may then write the payload to a storage resource 44 (e.g., using DMA). Thus, up to four copies of the payload data may be made to transfer data from BIOS/UEFI application layer 30 to storage resource 44, for a total of nine copies of data to transfer the data from network 10 to storage resource 44. These multiple copies may force a BIOS in pre-boot mode to degrade performance, especially when performing bulk image transfers such as in an operating system deployment, firmware update, or other large file transfers.

SUMMARY

In accordance with the teachings of the present disclosure, the disadvantages and problems associated with file transfer in a boot mode of a basic input/output system may be substantially reduced or eliminated.

In accordance with embodiments of the present disclosure, an information handling system may include a processor, a network interface communicatively coupled to the processor, a storage resource communicatively coupled to the processor, and a basic input/output system (BIOS) comprising a program of instructions executable by the processor and configured to cause the processor to initialize one or more information handling resources of the information handling system. The BIOS may be further configured to, during a pre-boot environment of the information handling system: receive a datagram at the network interface from a network communicatively coupled to the network interface; determine if a variable is set within a header of the datagram indicating that a data payload of the datagram is to be bypassed by at least a portion of a network stack and a storage stack of the BIOS; and responsive to determining the variable is set, bypass the data payload by at least a portion of the network stack and the storage stack of the BIOS.

In accordance with these and other embodiments of the present disclosure, a method may include, during a pre-boot environment of an information handling system executed by a basic input/output system (BIOS) comprising a program of instructions executable by the processor and configured to cause the processor to initialize one or more information handling resources of the information handling system: receiving a datagram at a network interface of the information handling system from a network communicatively coupled to the network interface; determining if a variable is set within a header of the datagram indicating that a data payload of the datagram is to be bypassed by at least a portion of a network stack and a storage stack of the BIOS; and responsive to determining the variable is set, bypassing the data payload by at least a portion of the network stack and the storage stack of the BIOS.

In accordance with these and other embodiments of the present disclosure, an article of manufacture may include a non-transitory computer readable medium; and computer-executable instructions carried on the computer readable medium, the instructions readable by a processor. The instructions, when read and executed, may causing the processor to, during a pre-boot environment of the information handling system executed by a basic input/output system (BIOS) comprising a program of instructions executable by the processor and configured to cause the processor to initialize one or more information handling resources of the information handling system: receive a datagram at a network interface of the information handling system from a network communicatively coupled to the network interface; determine if a variable is set within a header of the datagram indicating that a data payload of the datagram is to be bypassed by at least a portion of a network stack and a storage stack of the BIOS; and responsive to determining the variable is set, bypass the data payload by at least a portion of the network stack and the storage stack of the BIOS.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
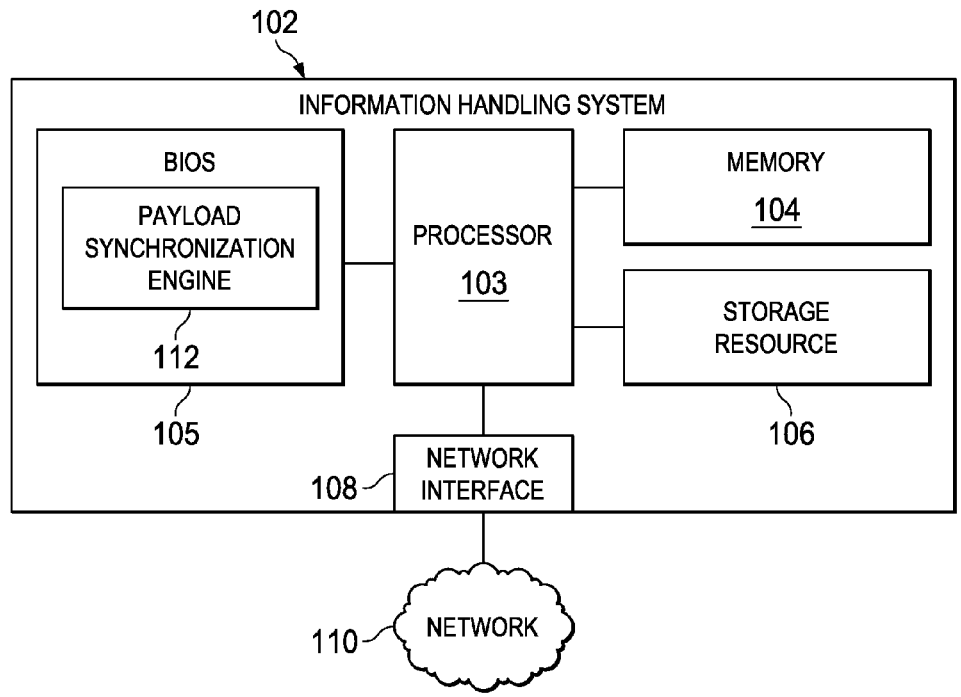
FIG. 1 illustrates a block diagram of an example information handling system, in accordance with the present disclosure.
Figure 3:
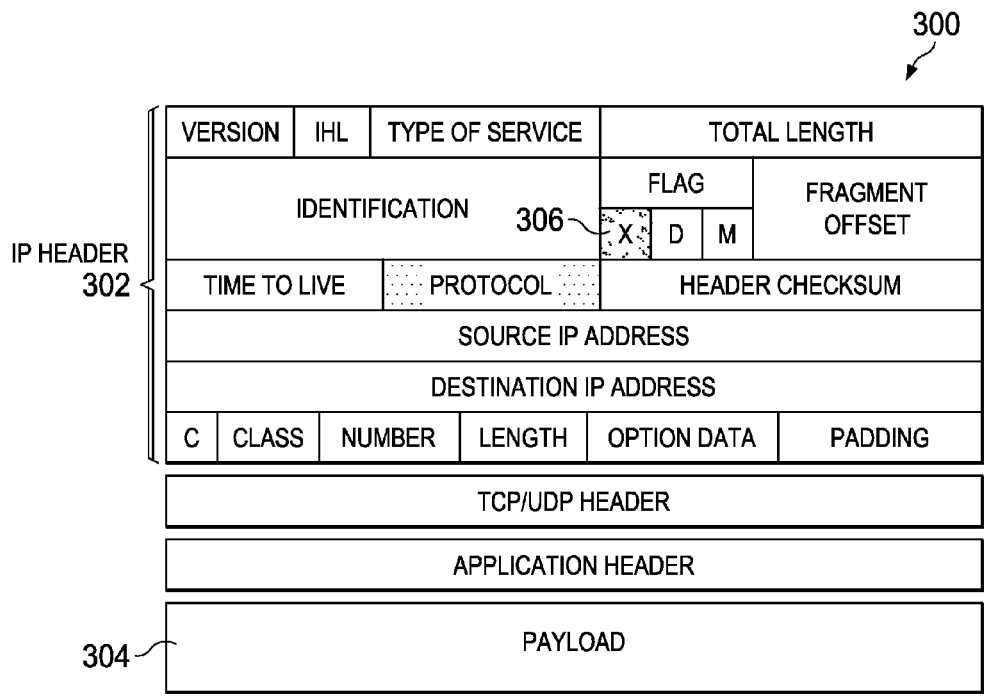
FIG. 3 illustrates an example IP packet, in accordance with the present disclosure.
Figure 2:
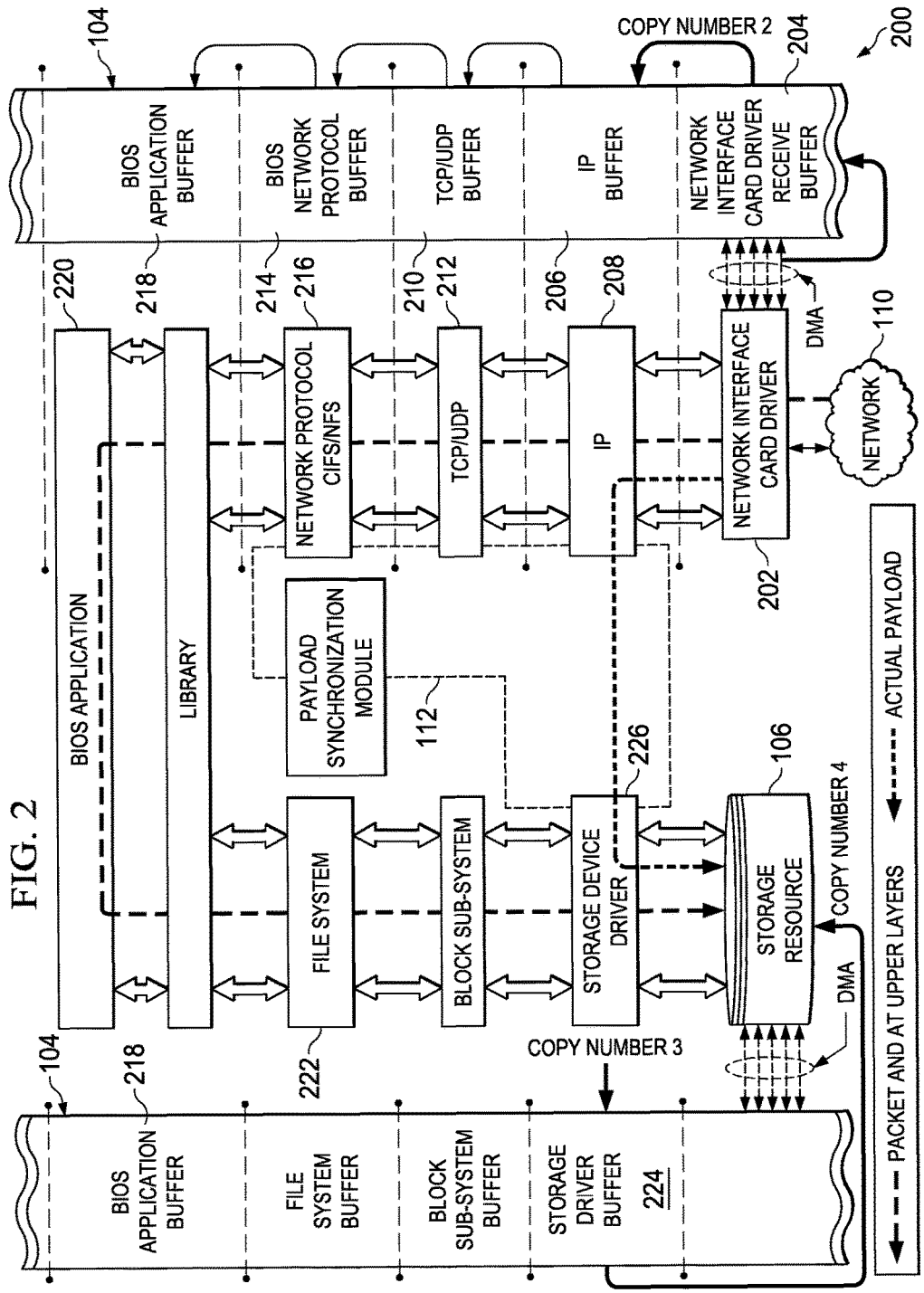
FIG. 2 illustrates a diagram depicting transfer of data through a network stack and storage stack including bypassing of data by a BIOS payload synchronization engine, in accordance with the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, an information handling system 102 may be a portable computing device (e.g., a laptop, notebook, tablet, handheld, smart phone, personal digital assistant, etc.). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104 communicatively coupled to processor 103, a BIOS 105 communicatively coupled to processor 103, a storage resource 106 communicatively coupled to processor 103, and a network interface 108 communicatively coupled to processor 103 and a network 110.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, and/or another component of information handling system 102. Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. BIOS 105 may also be configured with functionality for receiving information from network 110 and storing such information in storage resource 106.

As shown in FIG. 1, BIOS 105 may include a payload synchronization engine 112. Payload synchronization engine 112 may comprise a subset of instructions of BIOS 105 that may facilitate efficient transfer of data from network interface 108 to storage resource 106. Functionality of payload synchronization engine 112 is described in greater detail below with respect to FIG. 2.

Storage resource 106 may be communicatively coupled to processor 104 and may include any system, device, or apparatus operable to store information processed by processor 103. Storage resource 106 may include, for example, one or more direct access storage devices (e.g., hard disk drives). Although storage resource 106 is shown as internal to information handling system 102 in FIG. 1, in some embodiments storage resource 106 may be external to information handling system 102.

In addition to processor 103, memory 104, BIOS 105, storage resource 106, and network interface 108, information handling system 102 may include one or more other information handling resources.

FIG. 2 illustrates a diagram depicting transfer of data through a network stack and storage stack 200 by BIOS 105 including bypassing of data by payload synchronization engine 112, in accordance with the present disclosure.

Upon receipt of a datagram (e.g., Ethernet frame, packet, etc.) at network interface 108 from network 110, a network interface card driver 202 may write the datagram to a receive buffer 204 of memory 104 (e.g., via DMA). In turn, network interface card driver 202 may strip an Ethernet header from the datagram and copy the remaining IP packet to IP buffer 206 of memory 104.

After the packet has been buffered in IP buffer 206, IP layer 208 may strip an IP header from the packet and examine the IP header to determine if a variable within the IP header indicates that payload synchronization engine 112 is to be used to bypass payload data of the packet through a portion of the network stack and storage stack 200. In some embodiments, the variable may comprise a single bit within the IP header. To illustrate, FIG. 3 depicts an example IP packet 300 including an IP header 302 and a payload 304. As shown in FIG. 3, IP header 302 may include a flag bit 306 which may be used as the variable for indicating whether payload synchronization engine 112 is to be used to bypass payload data of the packet through a portion of the network stack and storage stack 200. For example, if flag bit 306 is set to 0, it may indicate that payload synchronization engine 112 is not to be used to bypass payload data of the packet through a portion of the network stack and storage stack 200. On the other hand, if flag bit 306 is set to 1, it may indicate that payload synchronization engine 112 is to be used to bypass payload data of the packet through a portion of the network stack and storage stack 200.

If the variable within IP header 302 indicates that payload synchronization engine 112 is to be used to bypass payload data of the packet through a portion of the network stack and storage stack 200, IP layer 208 may retain payload 304 in IP buffer 206 and may pass the remaining packet minus IP header 302 and payload 304 to TCP/UDP buffer 210 of memory 104. In doing so, IP layer 208 may validate IP header 302, perform data checksums, and determine the actual payload 304.

Figure 4:
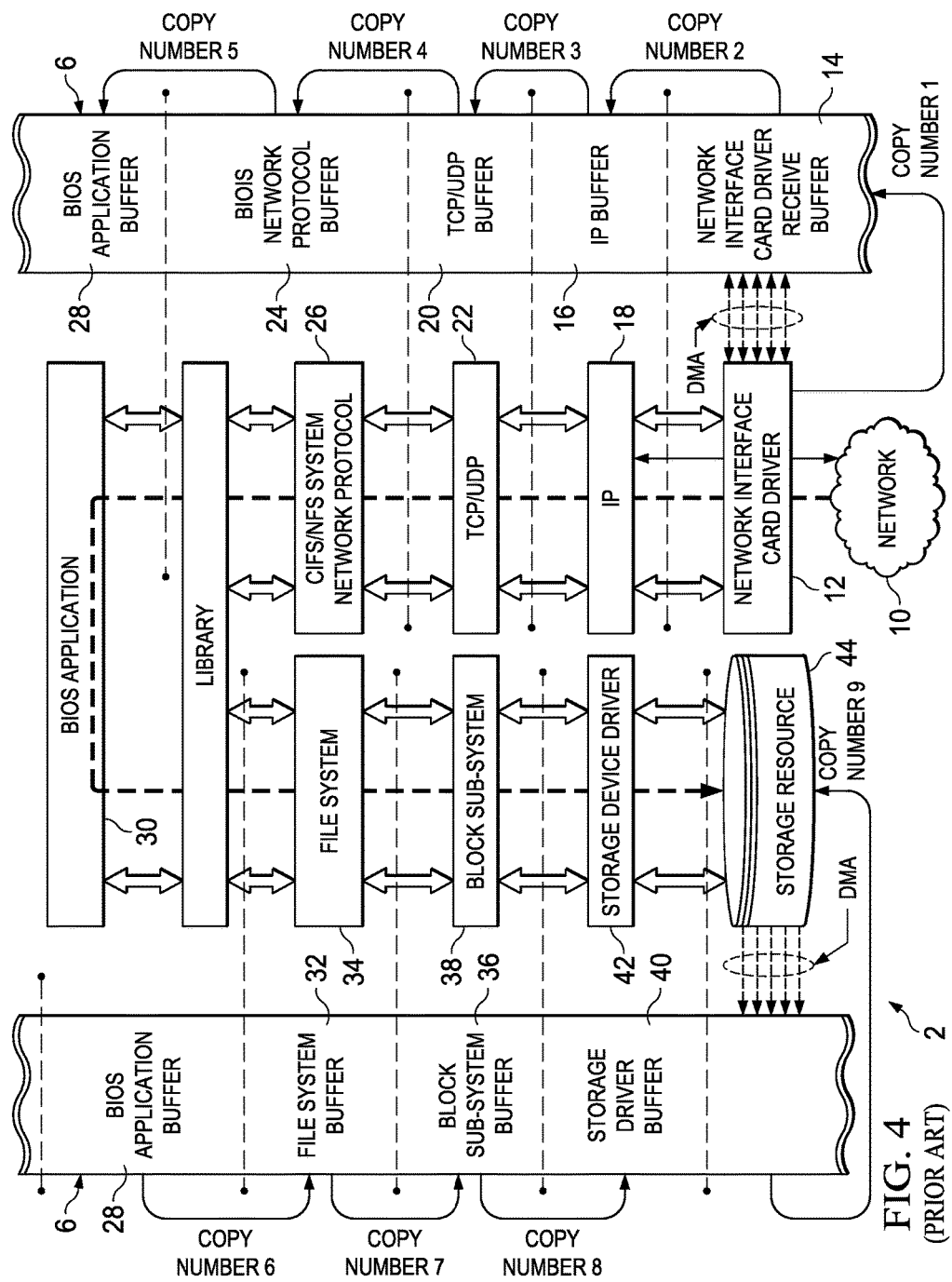
FIG. 4 illustrates a diagram depicting transfer of data through a network stack and storage stack, as is known in the art.

On the other hand, if the variable within IP header 302 indicates that payload synchronization engine 112 is not to be used to bypass payload data of the packet through a portion of the network stack and storage stack 200, IP layer may pass the entire packet minus IP header 302 to TCP/UDP buffer 210, in accordance with standard practice known in the art, as described with respect to FIG. 4, in which case payload 304 may be copied at each level of network and storage stack 200. The remainder of the discussion of FIG. 2 focuses on functionality that occurs when the variable within IP header 302 indicates that payload synchronization engine 112 is to be used to bypass payload data of the packet through a portion of the network stack and storage stack 200.

After receipt of the remaining packet stripped of IP header 302 and payload 304, TCP/UDP layer 212 may strip the TCP/UDP header and store the remaining packet in a BIOS network protocol buffer 214 of memory 104 by stripping a TCP/UDP header from the remaining packet. In doing so, TCP/UDP layer 212 may process timeouts, perform packet sequencing, and/or other tasks typically accomplished by TCP and/or UDP. A Common Internet File System (CIFS) and/or Network File System (NFS) protocol layer 216 may in turn strip an application-level protocol header and store the remaining information in a BIOS/UEFI application buffer 218. In doing so, such protocol layer 216 may validate the application-level protocol header and parameter block and may return the number of bytes received from the network minus the number of bytes of payload 304.

In response to receiving a packet without a payload, BIOS/UEFI application layer 220 of BIOS 105 may signal payload synchronization engine 112 to take further action. In addition, BIOS/UEFI application layer 220 may communicate an open file request, so that a file may be opened in storage resource 106 to store payload 304.

With the open file request from BIOS/UEFI application layer 220, BIOS 105 may trigger a file system layer 222 to create a new inode by populating file attributes from the application-level protocol header, and obtains an allocation offset from a storage controller of storage resource 106 to store payload 304. File system layer 222 may further signal payload synchronization module to storage driver buffer 224 of memory 104. Storage device driver layer 226 may then store the payload in storage 106 (e.g., via DMA).

As is seen above, the above bypass procedure requires only four copies to transfer data from network 110 to storage resource 106, which may thus reduce the number of copies made and increase overall throughput for bulk data transfers. Thus, whenever a large file transfer is to take place, a source of the data (e.g., a server coupled to information handling system 102 via network 110), may set the variable within IP header 302 to indicate that payload synchronization engine 112 is to be used to bypass payload data of the packet through a portion of the network stack and storage stack 200. When receiving packets from network 110 at network interface 108, IP layer 208 of BIOS 104 may check whether the variable has been set, and if set, payload 304 is retained at IP layer 208 and the remainder of the packet (headers without payload) are passed to upper layers of the network stack, and BIOS 105 may be configured (e.g., by means of vendor-specific library calls) to indicate to BIOS/UEFI application layer 220 that the data buffer may empty.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a network interface communicatively coupled to the processor;
   a storage resource communicatively coupled to the processor; and
   a basic input/output system (BIOS) comprising a program of instructions executable by the processor and configured to cause the processor to initialize one or more information handling resources of the information handling system, wherein the BIOS is further configured to perform pre-boot operations, during a pre-boot environment of the information handling system, wherein the pre-boot operations include:
   receiving a datagram at the network interface from a network communicatively coupled to the network interface wherein the datagram includes a datagram header and a datagram packet, wherein the datagram packet comprises an Internet Protocol (IP) packet including:
     an IP header;
     a second layer header, wherein the second layer header is selected from a transport control protocol (TCP) header and a user datagram protocol (UDP) header;
     an application header; and
     a payload;
   copying the IP packet to an IP buffer;
   performing IP layer processing of the IP packet;
   determining a second layer packet based on the IP packet and a particular bit of the IP header wherein the second layer packet includes:
     the second layer header;
     the application header; and
     unless the particular bit is set, the payload; and
   storing the second layer packet in a second memory buffer associated with second layer of the network stack.

2. The information handling system of claim 1, wherein the pre-boot operations further include:
   performing second layer processing of the second layer packet;
   stripping the second layer header from the second layer packet to produce a network protocol packet; and
   storing the network protocol packet in a network protocol buffer
   wherein the second layer is selected from a Transmission Control Protocol (TCP) layer and a User Datagram (UDP) layer and wherein the second layer header is selected from a TCP header and a UDP header.

3. The information handling system of claim 2, wherein the pre-boot operations include:
   validating, by a network protocol layer of the network stack, an application-layer header of the network protocol packet;
   stripping the application layer header from the network protocol packet; and
   storing a remaining portion of the network protocol packet as an application packet in an application buffer.

4. The information handling system of claim 3, wherein the pre-boot operations include:
   responsive to detecting no payload in the application packet, communicating an open file request for opening a file in a storage resource to store the payload.

5. The information handling system of claim 4, wherein the pre-boot operations include:
   creating an inode associated with the file; and
   populating the inode with file attributes from the application-layer header.

6. The information handling system of claim 5, wherein the pre-boot operations include:
   obtaining an allocation offset from a storage controller of storage resource;
   signaling a storage driver buffer to store the payload in the storage resource.

7. A method comprising, performing pre-boot operation during a pre-boot environment of an information handling system executed by a basic input/output system (BIOS) comprising a program of instructions executable by the processor and configured to cause the processor to initialize one or more information handling resources of the information handling system, wherein the pre-boot operations include:
receiving a datagram at the network interface from a network communicatively coupled to the network interface wherein the datagram includes a datagram header and a datagram packet, wherein the datagram packet comprises an Internet Protocol (IP) packet including:
an IP header;
a second layer header, wherein the second layer header is selected from a transport control protocol (TCP) header and a user datagram protocol (UDP) header;
an application header; and
a payload;
copying the IP packet to an IP buffer;
performing IP layer processing of the IP packet;
determining a second layer packet based on the IP packet and a particular bit of the IP header wherein the second layer packet includes:
the second layer header;
the application header; and
unless the particular bit is set, the payload; and
storing the second layer packet in a second memory buffer associated with second layer of the network stack.

8. The method of claim 7, further comprising:
performing second layer processing of the second layer packet;
stripping the second layer header from the second layer packet to produce a network protocol packet; and
storing the network protocol packet in a network protocol buffer
wherein the second layer is selected from a Transmission Control Protocol (TCP) layer and a User Datagram (UDP) layer and wherein the second layer header is selected from a TCP header and a UDP header.

9. The method of claim 8, further comprising:
validating, by a network protocol layer of the network stack, an application-layer header of the network protocol packet;
stripping the application layer header from the network protocol packet; and
storing a remaining portion of the network protocol packet as an application packet in an application buffer.

10. The method of claim 9, further comprising:
responsive to detecting no payload in the application packet, communicating an open file request for opening a file in a storage resource to store the payload.

11. The method of claim 10, further comprising: creating an inode associated with the file; and
populating the inode with file attributes from the application-layer header.

12. The method of claim 11, further comprising:
obtaining an allocation offset from a storage controller of storage resource;
signaling a storage driver buffer to store the payload in the storage resource.

13. An article of manufacture comprising:
a non-transitory computer readable medium; and
computer-executable instructions carried on the computer readable medium, the instructions readable by a processor, the instructions, when read and executed, for causing the processor to perform pre-boot operations, during a pre-boot environment of the information handling system, wherein the pre-boot operations include:
receiving a datagram at the network interface from a network communicatively coupled to the network interface wherein the datagram includes a datagram header and a datagram packet, wherein the datagram packet comprises an Internet Protocol (IP) packet including:
an IP header;
a second layer header, wherein the second layer header is selected from a transport control protocol (TCP) header and a user datagram protocol (UDP) header;
an application header; and
a payload;
copying the IP packet to an IP buffer;
performing IP layer processing of the IP packet;
determining a second layer packet based on the IP packet and a particular bit of the IP header wherein the second layer packet includes:
the second layer header;
the application header; and
unless the particular bit is set, the payload; and
storing the second layer packet in a second memory buffer associated with second layer of the network stack.

14. The article of manufacture of claim 13, wherein the pre-boot operations further include:
performing second layer processing of the second layer packet;
stripping the second layer header from the second layer packet to produce a network protocol packet; and
storing the network protocol packet in a network protocol buffer
wherein the second layer is selected from a Transmission Control Protocol (TCP) layer and a User Datagram (UDP) layer and wherein the second layer header is selected from a TCP header and a UDP header.

15. The article of manufacture of claim 14, wherein the pre-boot operations include:
validating, by a network protocol layer of the network stack, an application-layer header of the network protocol packet;
stripping the application layer header from the network protocol packet; and
storing a remaining portion of the network protocol packet as an application packet in an application buffer.

16. The article of manufacture of claim 15, wherein the pre-boot operations include:
responsive to detecting no payload in the application packet, communicating an open file request for opening a file in a storage resource to store the payload.

17. The article of manufacture of claim 16, wherein the pre-boot operations include:
creating an inode associated with the file; and
populating the inode with file attributes from the application-layer header.

18. The article of manufacture of claim 17, wherein the pre-boot operations include:
obtaining an allocation offset from a storage controller of storage resource;
signaling a storage driver buffer to store the payload in the storage resource.

* * * * *